United States Patent
Bradshaw

[11] 3,918,264
[45] Nov. 11, 1975

[54] IRRIGATION SYSTEM
[75] Inventor: Don L. Bradshaw, Caliente, Nev.
[73] Assignee: Grant C. Tucker, Cedar City, Utah
[22] Filed: Feb. 6, 1974
[21] Appl. No.: 439,917

[52] U.S. Cl. .................. 61/12; 251/294; 251/305
[51] Int. Cl.² .................. E02B 13/00; F16K 51/00
[58] Field of Search ............ 61/10, 12, 18; 137/236, 137/609, 624.18; 251/305, 294

[56] References Cited
UNITED STATES PATENTS

| | | | |
|---|---|---|---|
| 1,960,472 | 5/1934 | Balaam et al. | 61/12 X |
| 2,628,056 | 2/1953 | Fuller | 137/236 |
| 2,843,353 | 7/1958 | Marden | 251/306 |
| 3,498,584 | 3/1970 | Bowers | 251/305 |
| 3,738,611 | 6/1973 | Winders | 251/294 |
| 3,770,242 | 11/1973 | O'Connor | 251/305 |

OTHER PUBLICATIONS
"The Development of Automatic Irrigation Structures and Devices," Humphreys et al., U.S.D.A. Reprint from 1966 Reports, Hawaiian Sugar Technologists, pp. 152-159.

Primary Examiner—Paul R. Gilliam
Assistant Examiner—Alex Grosz
Attorney, Agent, or Firm—Jerry R. Seiler

[57] ABSTRACT

A control system for an irrigation system for use in controlling the flow of water from a main irrigation ditch to a branch field ditch comprising a first control device disposed in the main ditch beyond the branch ditch in the direction of flow of the water and a second control device disposed in the branch ditch. The water flowing in the main ditch is diverted by the first control device in the main ditch, which is normally closed, through the second control device in the branch ditch, which is normally open, and into the branch ditch, until such time as timing means in the first control device opens the first control device and the second control device is subsequently closed.

15 Claims, 7 Drawing Figures

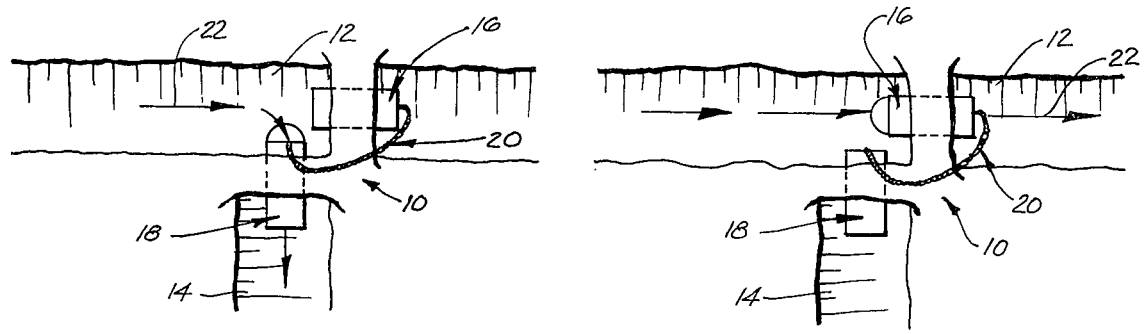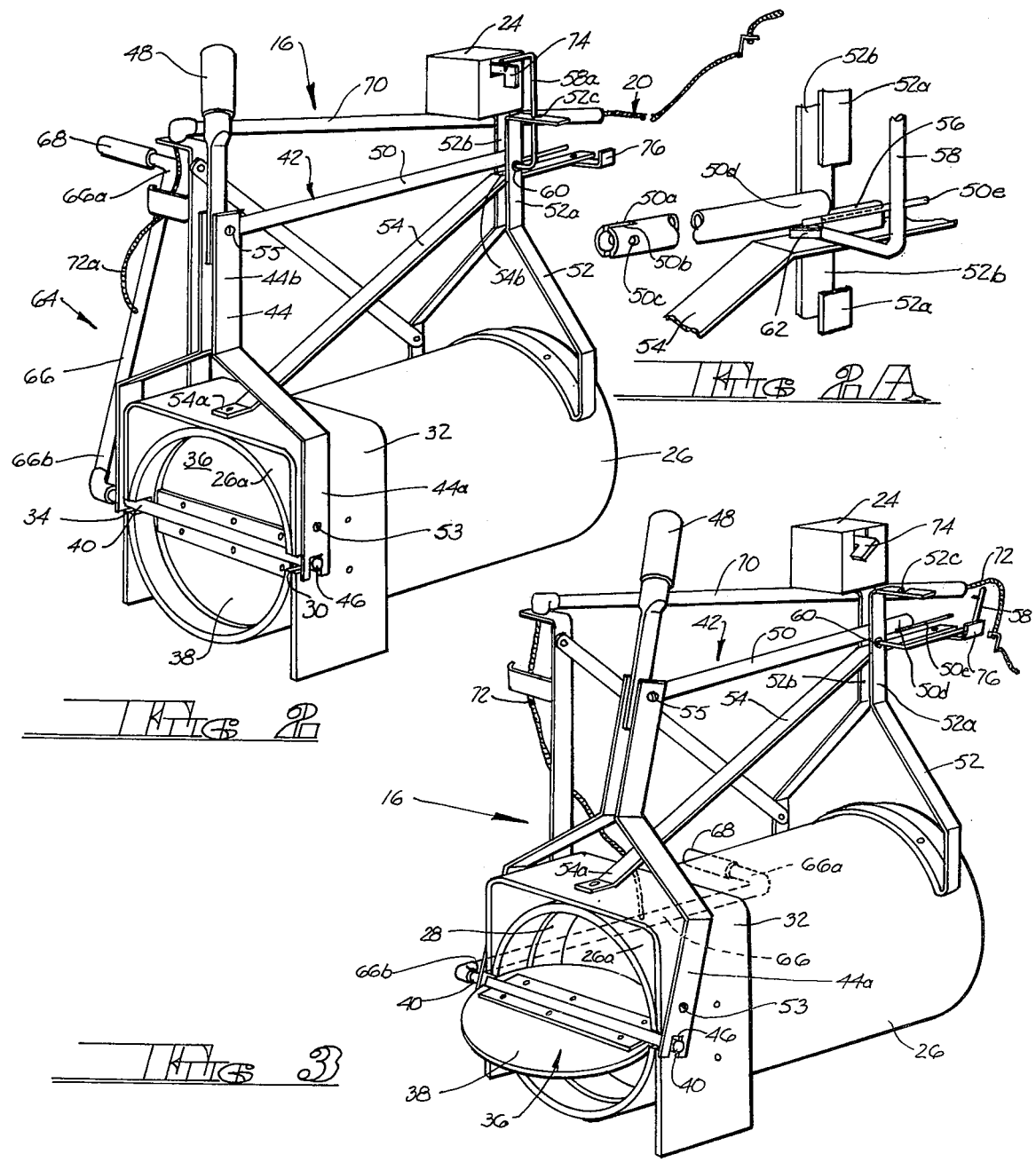

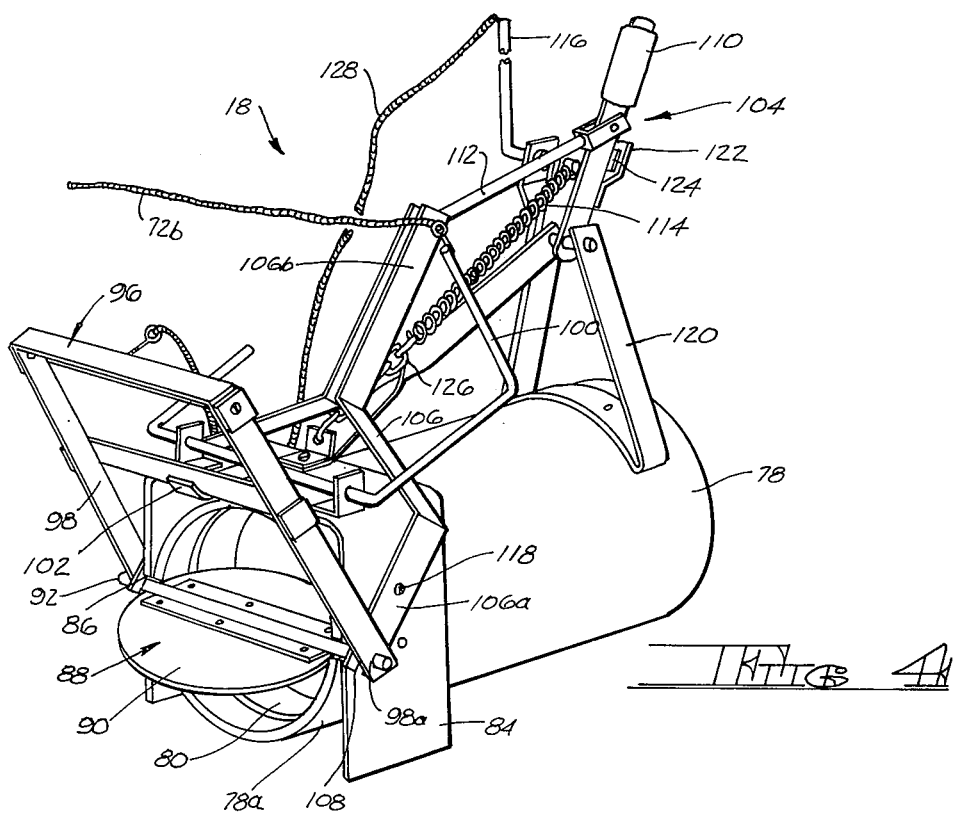
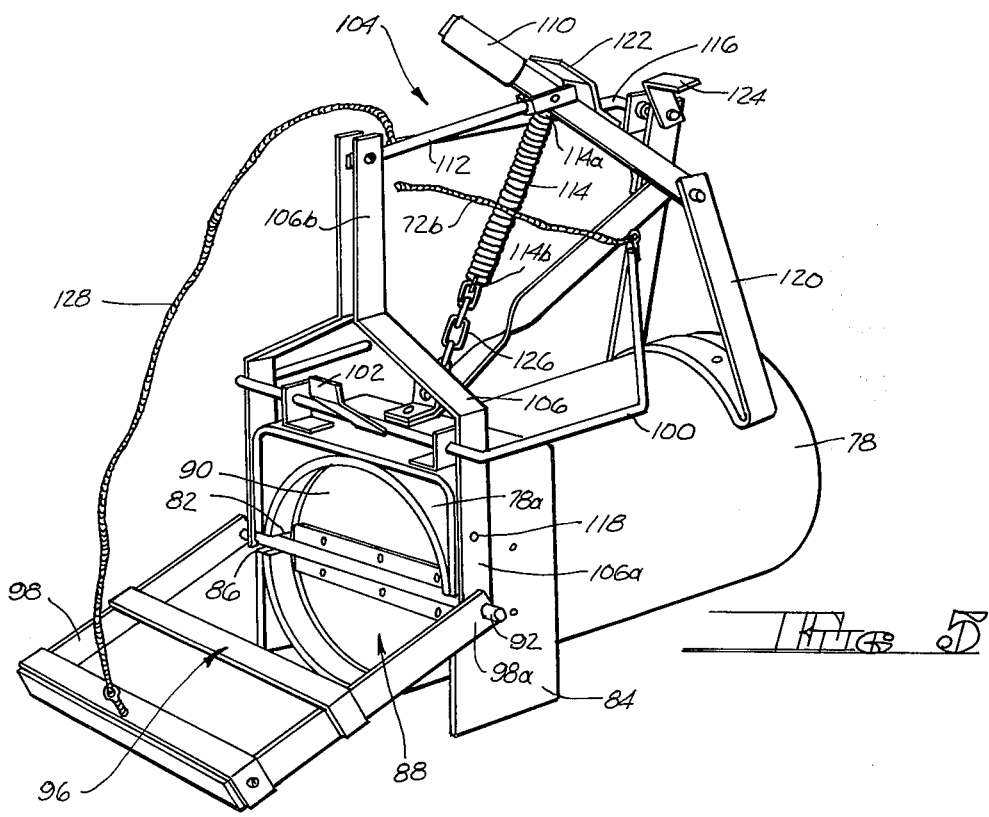

IRRIGATION SYSTEM

BACKGROUND OF THE INVENTION

1. Field of the Invention

The present invention relates to automatic control means for controlling the distribution of fluid, and more specifically to a control system for an irrigation system for use in controlling the flow of water from a main irrigation ditch to a branch field ditch.

2. Description of the Prior Art

Irrigation systems and the like generally include a plurality of ditches for supplying certain areas with water, and more particularly, a series of main water ditches having branch ditches extending therefrom. The flow of water into any branch ditch is generally controlled by a suitable valve, which in most instances requires manual operation. However, since water to any given area may be supplied at any time of day or night for any desired time interval, it is desirable to have a control system for controlling the flow of water from a main irrigation ditch to a branch field ditch, with such system being controlled so that manual operation thereof will be minimal.

While the prior art has long been concerned with the aforementioned problem and various systems and valves for this purpose have been developed, such as taught in U.S. Pat. No. 3,140,720, in the name of L. N. Griswold, and U.S. Pat. No. 3,545,478, in the name of Elmer H. Etgen, attempts to develop such a valve which is certain in its operation and which is easy to assemble, repair and maintain, have been unsuccessful.

SUMMARY OF THE INVENTION

The present invention provides a control system in an irrigation system for use in controlling the flow of water from a main irrigation ditch to a branch field ditch comprising a first control device disposed in the main ditch beyond the branch ditch in the direction of flow of the water and a second control device disposed in the branch ditch. The water flowing in the main ditch is diverted by the first control device in the main ditch, which is normally closed, through the second control device in the branch ditch, which is normally open, and into the branch ditch, until such time as timer means in the first control device opens the first control device and the second control device is subsequently closed.

The first control device comprises a conduit disposed centrally in the main ditch beyond the branch ditch in the direction of flow of the water with the longitudinal axis thereof substantially parellel to the axis of the main ditch. A seal is secured to the interior surface of the conduit and extends therearound. Valve means are mounted in the conduit for axial and pivotal movement, with the valve means being moveable axially from a first position in sealing contact with the seal to a second position spaced therefrom where the valve means may be pivoted from a normally closed position, whereby flow of water in the main ditch is substantially precluded, to an open position, whereby flow of water in the main ditch is allowed. Means are provided to axially move the valve means, and means are provided to pivot the valve means. Finally, timer means actuate the means to axially move the valve means.

The second control device comprises a conduit disposed centrally in the branch ditch with the longitudinal axis thereof substantially parallel to the axis of the branch ditch. A seal is secured to the interior surface of the conduit and extends therearound. Valve means are mounted in the conduit for axial and pivotal movement, with the valve means being axially moveable from a first position spaced from the seal where the valve means may be pivoted from a normally open position, whereby flow of water from the main ditch through the conduit and through the branch ditch is allowed, to a closed position, whereby flow in the branch ditch is precluded, to a second position in sealing contact with the seal. Means are provided to pivot the valve means, and means are provided to axially move the valve means.

Finally, means are provided joining the means to pivot the valve means of the first control device to actuate the means to pivot the valve means of the second control device.

BRIEF DESCRIPTION OF THE DRAWINGS

FIG. 1A is a schematic flow diagram showing the control system of the present invention in the normal position wherein the water flowing in the main ditch is diverted by the first control device in the main ditch, through the second control device in the branch ditch, and into the branch ditch.

FIG. 1B is a schematic flow diagram of the control system shown in FIG. 1A after the timer means in the first control device opens the first control device and the second control device is closed.

FIG. 2 is a perspective view of the first control device in the main ditch in the normally closed position.

FIG. 2A is a fragmentary perspective view of the latch means of the first control device when such device is in the position shown in FIG. 2.

FIG. 3 is a perspective view of the first control device in the main ditch in the open position.

FIG. 4 is a perspective view of the second control device in the branch ditch in the normally open position.

FIG. 5 is a perspective view of the second control device in the branch ditch in the closed position.

DESCRIPTION OF THE PREFERRED EMBODIMENTS

Turning first to the schematic flow diagrams of FIGS. 1A and 1B, it will be seen that the control system 10 of the present invention for use in controlling the flow of water from a main irrigation ditch 12 to a branch field ditch 14 comprises a first control device 16 disposed in the main ditch 12 beyond the branch ditch 14 in the direction of flow 22 of the water, a second flow control device 18 disposed in the branch ditch 14, and actuating means 20 joining the first control device 16 to the second control device 18.

In operation, the water flowing in the main ditch 12 is diverted by the first control device 16 in the main ditch 12, which is normally closed, through the second control device 18 in the branch ditch 14, which is normally open, and into the branch ditch 14, as shown in FIG. 1A, until the timer means 24 of the first control device 16 opens the first control device 16 and through the actuating means 20 joining the first and second control device 16 and 18, respectively, the second control device 18 is subsequently closed, at which time the water flow 22, through the main ditch 12, as shown in FIG. 1B.

The first control device 16 is shown in FIGS. 2, 2A and 3, with FIGS. 2 and 3 showing the first control device 16 in the normally closed and open positions, respectively. More particularly, it will be seen that the first control device comprises a conduit 26 disposed centrally in the main ditch 12 beyond the branch ditch 14 in the direction of flow 22 of the water with the longitudinal axis thereof substantially parallel to the axis of the main ditch 12. A seal 28, such as an annular seal, is secured to the interior surface of the conduit 26 and extends therearound. The conduit 26 is provided with slots 30 therein defined at diametrically opposite sides of the conduit 26. One edge of the seal 28 is adjacent the slot 30. The longitudinal axis of the slots 30 in the conduit 26 is parallel to and planar with the axis of the conduit 26. The slots 30 are preferably positioned at one end 26a of the conduit 26.

A shield or hood 32 having slots 34 is secured over the end 26a of the conduit 26 with the slots 34 in the hood 32 mating with the slots 30 in the conduit 26.

Valve means 36 is mounted in the conduit 26 for axial and pivotal movement. The valve means 36 comprises a rotatable plate 38 having journals 40 at diametrically opposite sides which are mounted in the slots 30 and 34 for axial and rotatable movement therein. As can be seen the valve means 36 is moveable axially from a first position in sealing contact with the seal 28 to a second position spaced therefrom where the valve means 36 may be pivoted from a normally closed position, whereby flow of water in the main ditch 12 is substantially precluded, to an open position, whereby flow of water in the main ditch 12 is allowed. The means 42 to axially move the valve means 36 of the first control device 16 comprises yoke bracket arms 44 the ends of the bifurcations 44a which are provided with slots 46, associated handle 48 and hinge bar 50. As can be seen, the bifurcations 44a of the yoke 44 are pivotally mounted at 53 to the shield or hood 32, with the slots 46 thereof receiving the journals 40 of the rotatable plate 38 extending through the mating slots 30 and 34. The associated handle 48 is secured at 55 to the upper portion 44b of the yoke arms 44. A hinge bar 50, one end of which 50a is provided with a slot 50b having an aperture through the walls thereof, is slidably and pivotally secured to the upper portion 44b of the yoke arms 44 and the associated handle 48 at 55. The other end 50d of the hinge bar 50 is provided with a guide rod 50e.

An up right main frame and mounting bracket 52 is secured on the top of the conduit 26 and supports timer means 24, such as any well known self-contained timer, which may be battery or mechanically operated. The mounting bracket 52 includes spaced upper arm portions 52a and 52b. The end of the upper portion 52b is flared outwardly and receives the timer means 24. The end of the upper portion 52a is also flared outwardly, but in the opposite direction, and is provided with a notch 52c. A brace member 54 is secured at one end 54a to the top of the shield or hood 32 and at the other end 54b to the spaced upper arms 52a and 52b. An elongated dog member 56 is secured to the brace 54 adjacent to where the brace 54 is secured to the arms 52a and 52b. A trip arm 58 carrying a cam 60 is pivotally mounted through the arms 52a and 52b at 60 with the cam 62 positioned between the spaced arms 52a and 52b adjacent the end of the elongated dog 56.

The means 64 to pivot the valve means 36 comprises an arm 66 one end 66a thereof being provided with a handle 68 and the other end 66b thereof being secured to a journal 40 of the rotatable plate 38. Suitable supporting structure 70, which may comprise a hollow pipe, receives a cable 72, one end 72a of which is secured to the arm 66 and the other end 72b of which is secured to the second control device 18.

In the normal position the first control device 16 is closed as shown in FIGS. 2 and 2A, at which time the rotatable plate 38 is in a position substantially perpendicular to the axis of the conduit 26 and in abutment with the seal 28. It should be noted that in such position the handles 48 and 68 are upright and that the guide rod 50e is positioned such that the end 50d of the hinge bar 50 is abutting the dog 56 and resting upon the trip arm 58, which is also in an upright position in the notch 52c such that the cam member 62 is in its lowermost position and the end 58a thereof is in contact with the actuating arm 74 of the timer means 24. In operation, the timer means 24 actuates the timer arm 74, which in turn causes the trip arm 58 to move downwardly. The downward movement of the trip arm 58, which subsequently causes the trip arm 58 to rest against the support 76, causes the cam 62 to rotate from its lowermost position to its uppermost position, which moves the hinge bar 50 upwardly and over the dog 56, causing the hinge bar 50, handle 48 and yoke bracket arms 44 to pivot. As the bifurcations 44a of the yoke arms 44 pivot at 53, the journals 40, and thus the plate 38, are moved axially from a position where the plate 38 is in sealing contact with the seal 28 to a position spaced therefrom where the plate 38 may be pivoted. The arm 66, by gravity, moves downwardly, pivoting the plate 38 from a normally closed position substantially perpendicular to the axis of the conduit 26 to an open position substantially parallel to the axis of the conduit 26. The movement of the arm 66 downwardly causes the cable 72 to also travel downwardly. This in turn actuates the second control device 18, as will be more fully explained hereinafter.

The second control device 18, as shown in the normally open position in FIG. 4 and in the closed position in FIG. 5, comprises a conduit 78 disposed centrally in the branch ditch 14 with the longitudinal axis thereof substantially parallel to the axis of the branch ditch 14. A seal 80, such as an annular seal, is secured to the interior conduit 17 and extends therearound. The conduit 78 is provided with slots 82 therein defined at diametrically opposite sides of the conduit 78. One edge of the seal 80 is adjacent the slots 82. The longitudinal axis of the slots 82 in the conduit 78 is parallel to and planar with the axis of the conduit 78. The slots 82 are preferably positioned at one end 78a of the conduit 78.

A shield or hood 84 having slots 86 is secured over the end 78a of the conduit 78 with the slots 86 in the hood 84 mating with the slots 82 in the conduit 78.

Valve means 88 is mounted in the conduit 78 for axial and pivotal movement. The valve means 88 comprises a rotatable plate 90 having journals 92 at diametrically opposite sides which are mounted in the slots 82 and 86 of the conduit 78 and hood 84, respectively, for axial and rotatable movement therein. As can be seen the valve means 88 is moveable axially from a first position spaced from the seal 80 where it may be pivoted from a normally open position, whereby flow of water form the main ditch 12, through the conduit 78 and through the branch ditch 14, is allowed, to a closed position, whereby flow in the branch ditch 14 is substantially precluded, as shown in FIG. 4, to a second position in sealing contact with the seal 80, as shown in FIG. 5.

The means 94 to pivot the valve means 88 of the second control device 18 comprises a bracket 96 having spaced arms 98 the ends 98a of which are fixedly secured to the journals 92 of the rotatable plate 90 such that when the plate 90 is in the open position and substantially parallel to the axis of the conduit 78, the bracket 96 is in the upright position as show in FIG. 4. A primary trip arm 100 having a holding catch fixedly secured thereto is pivotally mounted to the top of the shield or hood 84 such that when the plate 90 is in the fully open position and substantially parallel to the axis of the conduit 78, the bracket 96 is retained in its upright position by the holding catch 102. The ends 72b of the cable 72 is secured to the primary trip arm 100, and it will thus be seen that if the cable 72 is pulled toward the first control device 16, the primary arm 100 will be rotated, causing the holding catch 102 to rotate therewith and thus release the bracket 96. As the bracket 96 moves downwardly due to the force of gravity, the journals 92, and thus the plate 90, are rotated, with the plate 90 moving from the open position substantially parallel to the axis of the conduit 78 to a closed position substantially perpendicular to the axis of the conduit 78, as shown in FIG. 5.

The means 104 to axially move the valve means 88 of the second control device 18, comprises yoke bracket arms 106, the ends of the bifurcations 106a of which are provided with the slots 108, associated handle 110 and hinge bar 112, spring 114, and secondary trip arm 116. As can be seen, the bifurcations 106a of the yoke arms 106 are pivotally mounted at 118 to the shield or hood 84, with the slots 108 thereof rotatable receiving the journals 92 of the rotatable plate 90 extending through the mating slots 82 and 86 of the conduit 78 and the hood 84, respectively. A supporting brace 120 secured to the conduit 78 pivotally carries the associated opening handle 110 as well as the secondary trip arm 116. The opening handle 110 contains a locking arm 122 which receives the locking element 124 secured to the pivotal secondary trip arm 116. The handle 110 is pivotally joined to the upper portion 106b of the yoke arms 106 by the hinge bar 112. A spring 114, one end 114a of which is attached to the handle 110 and the other end 114b of which is attached to an adjustable chain secured to the hood 84, assures rotation of the handle 110, with the degree of tension in the spring 114 being controlled by the adjustable chain 126. A secondary trip cord 128 joins the bracket 96 and the secondary trip arm 116.

As previously indicated, the second control device 18 is normally in the open position shown in FIG. 4, at which time the first control device 16 is normally in the closed position shown in FIG. 2, and water flowing in the main ditch is diverted by the first control device 16 in the main ditch 12, through the second control device 18 in the branch ditch 14, and into the branch ditch 14. As previously indicated in connection with the operation of the first control device 16, when the timer means 24 thereof opens the first control device 16, shown in FIG. 3, at which time the arm 66 is rotated downwardly, the cable 72 is pulled downwardly therewith. Accordingly, the end 72b of the cable 72 secured to the primary trip arm 100 causes the trip arm 100 to rotate, whereupon the holding catch 102 releases the upright bracket 96, which moves downwardly of its own weight, causing the journals 92 and thus the plate 90 to rotate, whereupon the plate 90 is pivoted from a normally open position substantially parallel to the axis of the conduit 78, whereby flow of water from the main ditch 12 through the conduit 78 and through the branch ditch 14 is allowed, to a closed position substantially perpendicular to the axis of the conduit 78, whereby flow in the branch ditch 14 is substantially precluded. When the bracket 96 reaches its most downward position, it causes the secondary trip cord 128 to rotate the secondary trip arm 116, whereupon the locking elements secured to the secondary trip arm 116 is removed from the locking arm 122. The handle 110, with the force of the spring 114, is now free to rotate, causing the hinge bar 112 to pivot the yoke arms 106 about the point 118. This movement in turn axially moves the valve means 90 in the slots 82 and 86 of the conduit 78 and the hood 84, respectively, from a first position spaced from the seal 80 to a second position in sealing contact with the seal 80. The flow of water 22 in the branch ditch 14 is thus discontinued and redirected into the main ditch 12.

The first and second control devices 16 and 18 may, of course, be reset so as to operate as indicated schematically in FIG. 1A and as shown in FIGS. 2 and 4. The timer means 24 may be set to actuate the first control device 16 as desired.

It will, of course, be understood that many possible embodiments may be made of the invention without departing from the scope thereof. For example, the control device 16 of the present invention may be operated independently as a control system for use in controlling the flow of water in an irrigation ditch. Accordingly, all matters herein set forth or shown in the accompanying drawings is to be interpreted as illustrative and not in a limiting sense.

The embodiments of the invention in which an exclusive property or privilege is claimed are defined as follows:

1. In an irrigation system, a control system for use in controlling the flow of water from a main irrigation ditch to a branch field ditch comprising the combination:
   a. a first control device comprising a conduit disposed centrally in said main ditch beyond said branch ditch in the direction of flow of said water with the longitudinal axis thereof substantially parallel to the axis of said main ditch, a seal secured to the interior surface of said conduit and extending therearound, valve means mounted in said conduit for axial and pivotal movement, said valve means being moveable axially from a first position in sealing contact with said seal to a second position spaced therefrom where said valve means may be pivoted from a normally closed position, whereby flow of water in said main ditch is substantially precluded, to an open position, whereby flow of water in said main ditch is allowed, means to axially move said valve means, means to pivot said valve means, and timer means to actuate said means to axially move said valve means;
   b. a second control device comprising a conduit disposed centrally in said branch ditch with the longitudinal axis thereof substantially parallel to the axis of said branch ditch, a seal secured to the interior surface of said conduit and extending therearound, valve means mounted in said conduit for axial and pivotal movement, said valve means being axially moveable from a first position spaced from said seal where said valve means may be pivoted from a normally open position, whereby flow of water from said main ditch through said conduit and through said branch ditch is allowed, to a closed position, whereby flow in said branch ditch is substantially precluded, to a second position in sealing contact with said seal, means to pivot said valve means, and means to axially move said valve means; and c. means joining said means to pivot said valve means of said first control device to actuate said means to pivot said valve means of said second control device;

whereby water flowing in said main ditch is diverted by said first control device in said main ditch, which is normally closed, through said second control device in said branch ditch, which is normally open, and into said branch ditch, until said timer means of said first control device opens said first control device and said second control device is subsequently closed.

2. The control system according to claim 1, wherein each said seal is an annular seal.

3. The control system according to claim 1, wherein each said valve means is closed in position substantially perpendicular to the axis of said conduit and in abutment with said seal.

4. The control system according to claim 1, wherein each said valve means is open in a position substantially parallel to the axis of said conduit.

5. The control system according to claim 1, wherein each of said conduits is provided with slots therein defined at diametrically opposite sides of said conduit, one edge of said seal being adjacent said slots, and wherein each of said valve means for said first and second control devices is mounted for movement therein.

6. The control system according to claim 5, wherein the longitudinal axes of said slots in each said conduit are parallel to and planar with the axis of said conduit.

7. The control system according to claim 6, wherein said slots in each said conduit are positioned at one end thereof.

8. The control system according to claim 7, wherein each said valve means comprises a rotatable plate having journals at diametrically opposite sides which are mounted in their respective slots for axial and rotatable movement therein.

9. The control system according to claim 8, wherein said means of said first control device to axially move said valve means thereof comprises yoke bracket arms the ends of the bifurcations of which are provided with slots, said slots being received by said journals of said rotatable plate and said bifurcations being pivotally fixed to means on said conduit, a handle secured to the upper portion of said yoke arms, and a hinge bar substantially parallel to the axis of said conduit one end of which is slidably and rotatably secured to the upper portion of said yoke arms and handle and the other end of which is received by latch means cooperating with said timer means.

10. The control system according to claim 9, wherein said means of said first control device to pivot said valve means thereof comprises an arm with one end thereof being secured to one of said journals of said rotatable plate and the other end thereof being provided with a handle.

11. The control system according to claim 10, wherein said means of said second control device to pivot said valve means thereof comprises a bracket having spaced arms the ends of which are fixedly secured to said journals of said rotatable plate such that when said plate is in the open position and substantially parallel to the axis of said conduit, said bracket is in the upright position, and a primary trip arm having a holding catch fixedly secured thereto pivotally mounted to means on said conduit such that when said plate is in the fully open position and substantially parallel to the axis of said conduit said bracket is retained in its upright position by said holding catch, said means joining said means to pivot said valve means of said first control device to actuate said means to pivot said valve means of said second control device being attached to said primary trip arm.

12. The control system according to claim 11, wherein said means of said second control device to axially move said valve means thereof, comprises yoke bracket arms the ends of the bifurcations of which are provided with slots, said slots being received by said journals of said rotatable plate and said bifurcations being pivotally fixed to first means on said conduit, a handle pivotally secured to second means on said conduit and carrying a locking arm, a secondary trip arm carrying a locking element and being pivotally mounted to said second means on said conduit such that said locking element will mate with said locking arm, a hinge bar pivotally joining said handle to the upper portion of said yoke arms, spring means biasing said handle to assure rotation of said handle, hinge bar and yoke arms, and a secondary trip chord joining said means of said second control device to pivot said valve means thereof and said secondary trip arm, whereby said secondary trip arm is rotated when said valve means is moving from its open to closed position and said locking element is released from said locking arm, causing said handle, and thus said yoke arms, to pivot and, therefore, said valve means to move axially.

13. The control system according to claim 12, wherein said means joining said means to pivot said valve means of said first control device to actuate said means to pivot said valve means of said second control device comprises a cable joining said arm secured to one of said journals of said first control device to said primary trip arm of said second control device.

14. In an irrigation system, a control device for use in controlling the flow of water through a ditch thereof comprising a conduit disposed centrally in said ditch with the longitudinal axis thereof substantially parallel to the axis of said ditch, a seal secured to the interior surface of said conduit and extending therearound, valve means mounted in said conduit for axial and pivotal movement, said valve means being moveable axially from a first position in sealing contact with said seal to a second position spaced therefrom where said valve means may be pivoted from a normally closed position, whereby flow of water in said ditch is substantially precluded, to an open position, whereby flow of water in said ditch is allowed, means to axially move said valve means, means to pivot said valve means, and timer means to actuate said means to axially move said valve means, wherein said conduit is provided with slots therein defined at diametrically opposite sides of said conduit and at one end thereof, one edge of said seal being adjacent said slots and wherein said valve means comprises a rotatable plate having journals at diametrically opposite sides which are mounted in said slots for axial and rotatable movement therein, and wherein the means to axially move said valve means thereof comprises yoke bracket arms the ends of the bifurcations of which are provided with slots, said slots being received by said journals of said rotatable plate and said bifurcations being pivotally fixed to means on said conduit, a handle secured to the upper portion of said yoke arms, and a hinge bar substantially parallel to the axis of said conduit one end of which is slidably and rotatably secured to the upper portion of said yoke arms and handle and the other end of which is received by latch means cooperating with said timer means.

15. The control device according to claim 14, wherein said means to pivot said valve means thereof comprises an arm with one end thereof being secured to one of said journals of said rotatable plate and the other end thereof being provided with a handle.

* * * * *